United States Patent
Lee

[11] 3,903,807
[45] Sept. 9, 1975

[54] MASS RAPID SYSTEM

[76] Inventor: Averette T. Lee, 1119 Stephens St., Smyrna, Ga. 30080

[22] Filed: Jan. 12, 1973

[21] Appl. No.: 323,248

[52] U.S. Cl. ............... 104/131; 104/125; 104/135; 104/163; 104/168; 105/30; 308/238
[51] Int. Cl. ............................................ E01b 25/12
[58] Field of Search .......... 104/124, 125, 135, 126, 104/168, 127, 128, 88, 130, 99, 103, 20, 131, 163; 308/238

[56] References Cited
UNITED STATES PATENTS

| | | |
|---|---|---|
| 1,198,605 | 9/1916 | Trent ............................ 104/135 |
| 2,652,785 | 9/1953 | Cox ............................ 104/135 X |
| 2,905,101 | 9/1959 | Sinden ........................ 104/20 X |
| 2,918,881 | 12/1959 | Kamp .......................... 104/103 X |
| 3,163,124 | 12/1964 | Hendrix ...................... 104/135 |
| 3,537,402 | 11/1970 | Harkness ..................... 104/168 |
| 3,670,658 | 6/1972 | Stelling ...................... 104/135 X |

*Primary Examiner*—Robert J. Spar
*Assistant Examiner*—Lawrence J. Oresky
*Attorney, Agent, or Firm*—Patrick F. Henry

[57] ABSTRACT

A rapid transit system which transports people and articles including automobiles, small trucks and the like throughout a network of local, branch or regional transit routes. The transit vehicle is a unitary, self-supporting structure which is transported and guided by spaced sets of wheels mounted and turning on pylons. The transit vehicle is compartmented into cubicles in one rigid structure which could be approximately 21 feet wide by 60 feet high and 1,500 to 2,000 feet long. The pylon construction supports the transit vehicle above the right of way property, typically at a minimum height of approximately 60 feet. Each pylon includes an upper power frame assembly having a large wheel for supporting and four smaller wheels for guiding the transit vehicle. A base frame mounted between the pylon and it foundation is provided when necessary to compensate for changes in grade. Motors driving the wheel are used to propel the transit vehicle over the pylons. These may be external motors driving through the propulsion wheel shaft or the propelling rotor may be integral with the propulsion wheel driving against stator coils framed from the bearing hub structure. Guide wheels on opposite sides of the power frame of the pylon are geared to turn at the same tread velocity as the propulsion wheel and absorb the wind side load of the vehicle. The power frame may include transformers, rectifiers, power controls, circuit breakers and other control and highly failsafe operating equipment responsive to the networks (remote) central control system. The transit vehicle is an elongated truss which would extend from one pylon to another in a cantilevered fashion. Thus the transit vehicle may engage with the next pylon approximately 300 feet away providing the only bridge for the vehicle as it proceeds along the route.

The system would include local routes that would eventually become integrated with branch and regional routes within the system. The pylons may be individually mounted on mobile trucks to roll in groups on tracks or rails to be moved sideways to simultaneously move the transit vehicle in this fashion. The pylons may be removed and be replaced as required by the transit vehicle itself so that the transit may continue uninterrupted.

25 Claims, 15 Drawing Figures

Fig. 15

MASS RAPID SYSTEM

BACKGROUND OF THE INVENTION

1. Field of the Invention

Transit and transporation system. Transit vehicles. The classification may be in Group 310-Class 104, Subclasses 124, 125 and 89 and Class 198, Subclasses 209 and 127.

2. DESCRIPTION OF THE PRIOR ART

U.S. Pat. No. 3,353,498 discloses a transit system utilizing a vehicle which is supported at spaced locations on supporting posts and guided by a cable. The support arrangement and power drive arrangement disclosed in the apparatus in this patent is not considered sufficient for the purposes of a mass transportation system carrying many passengers and other articles. The mere supporting of an elongated structural vehicle across spaced support posts will not satisfy the requirements of a rapidly moving vehicle at high speed carrying many passengers. Furthermore, the post support arrangement does not provide the power for the system which cannot be adequately achieved through small power rollers. In addition, a system of the sort disclosed in this patent would be subject to great wear and tear and the maintenance problem would be tremendous and likely would defeat the entire system. Transportation routes create as much a problem or more than the type of transportation vehicle system itself. The high cost of the acquisition of right of way and land plus the destruction of neighborhoods and other considerations including the total effect on the environment of the location and such factors is a serious problem with respect to laying out and constructing rapid transit systems such as ground level railway lines or underground subway lines. The cost of subway construction per mile is enormous. Track supported vehicle above ground cause problems with respect to ugliness and cost of the support structure for the tracks plus the high cost of grading and other land preparation. In the present system by using large, high pylons at significant distances apart the land in between and around the pylon is substantially undisturbed and trees, shrubs and other decorative material may be put between and around the pylons without difficulty. The topography is not disturbed because the pylons are high enough or low enough where needed to pass clear of obstructions and to compensate for the grades involved.

SUMMARY OF THE INVENTION

A primary object of this invention is to provide a mass transportation system which does not use either underground subway construction or ground level or above ground track construction but rather spaced vehicle pylon supports which can be fitted to the topography of the land and constructed high enough or low enought to accommodate a very long, self supporting, smoothly rolling transit vehicle structure which is compartmented for passengers and other cargo including highway vehicles.

The transit vehicle is long enough to be supported simultaneously by several widely spaced pylons and high enough to provide the rigidity needed to safely bridge, by cantilevering, from the last supporting pylon across a great distance (for example, 300 feet) to the next pylon in the series. The transit vehicle will provide local transportation services or may accelerate uniformly to continuous very high velocities even providing services between cities, and regionwide services throughout widely disbursed areas. A typical vehicle could be about five blocks long and stopping every ten blocks the passengers could walk part of the way to their destination while the transit vehicle is in motion. The motion of the transit vehicle will be very dependably regulated by controlled power to the individual pylons which respond in groups to the requirements of the scheduled vehicle. There is no foreseeable reason for having a sudden stop.

BRIEF DESCRIPTION OF THE DRAWING

FIG. 1 is a perspective view of a Rapid Transit Exchange installation where two Rapid Transit Routes cross. Two of the transit vehicles in the system have rolled across the supporting pylons into the exchange position. They will first unload their terminating cargo at the multi-level platforms, then be lifted straight up to clear the transit route for thru traffic or be lifted to clear the guiding wheels then be revolved to the center dock for exchanging cargo, permitting through traffic, be returned to each respective platform for the onloadiing of cargo and then proceed along their individual routes.

FIG. 2 is a front elevation view looking into either of the identical ends of the vehicle. The lower "enroute" vehicle position illustrates with dotted lines the tire displacement required to generate the (vehicle supporting) tire "foot print" as it engages the base of the vehicle. The upper vehicle position illustrates the lifted vehicle for the route thru-traffic condition.

FIG. 6 is a perspective view of one type of pylon with internal motor coils as shown in FIG. 4. The "nose" end of the transit vehicle is shown traversing the transit corridor and as it is about to enter the pylon and intercept the three beams of the (electric eye operated) vehicle position pilots mounted on the pylon. The laser beams of the pylon alignment monitors and the pylon alignment footing adjustments are also shown.

FIG. 7 is a side elevation view of either end of the transit vehicle shown in FIGS. 1 and 3 with a pylon positioning device thereon.

FIG. 8 is a perspective view of a transit vehicle shown in FIGS. 1 and 3 spanning a roadway while supported by six "upper" power frame pylons and one "lower" base frame pylon to compensate for grade fluctuation. The alignment beams are also illustrated.

FIG. 9 is a cross-sectional view of a typical transit exchange platform. The "lower" vehicle platform has an elevator mechanism for loading cages of highway vehicles at different levels. The "upper" platform with the vehicle alongside has three levels of cages to first unload the passengers then onload others or to simultaneously unload using "pass thru" cages while loading at (shown dotted) stations along the transit route.

DESCRIPTION OF THE PREFERRED EMBODIMENTS

As mentioned previously, the transit vehicle of the present invention which is designated generally by reference numeral 20 may be as long as 300 feet and high enough to include passenger compartments designated generally by reference numeral 22 and vehicle compartments designated generally by reference numeral 24. As seen in the cross-section view of FIG. 4 there are passenger compartments 22 side-by-side and vertically one above the other and these are on top of the vehicle compartments 24 which are arranged vertically one above the other. Vehicle 20 is constructed from elongated truss members or beams 26, transverse truss members or beams 28 and continuous upper 42 and lower 44 structural plates extending throughout the length of the vehicle as by welding or riveting to create an elongated truss skeleton frame for the vehicle 20 which is a self-supporting cantilever combined truss and box beam. The outside of the transit vehicle 20 is covered with a smooth skin of sheet and/or plate aluminum, stainless steel or other suitable material to provide smooth exterior walls 30, top 32 and bottom 46 which tapers at both ends 34 into a nose 36. Windows 40 are provided in the nose 36 for the purpose of visibility of the operator and passengers.

The bottom (load-bearing) plane 46 approximately 300 feet from each end of the vehicle curves slowly upward toward the nose such that when the vehicle sustains its maximum load bearing and cantilevered condition a shallow clearance shall be provided to clear the next supporting wheel 74. The vehicle's smooth, progressive engagement with the syncronously rotating wheel 74 generates the initial (vehicle supporting) "footprint" across the top of this wheel. In like manner, the vehicle will release this "footprint" from the opposite end as it proceeds along the route.

The sides of the vehicle will be curved similarly for engagement with the guiding wheels. Continuous guide wheel paths 48 unobstructed by window, doors, et al will be integrated into the vehicle's continuous guiding and wind side load path structure.

The wheel 74 progressively distributes tremendous loads across the bottom plane of the vehicle. These loads are distributed into the trusses 28 between the vehicle compartments by way of many longitudinal beams 96 in the floatation volume 98 below the bottom vehicle compartments 24.

The transit vehicle 20 is supported on a plurality of fixed pylons designated generally by reference numeral 50 and each comprising a suitable pylon base 52 which may be constructed from reinforced concrete, metal or a combination of both which support 52 is a pad having thereon a pair of spaced A-frame members 54, 56 made from tubular steel and each having a foot 58 that is firmly bolted and made adjustable upon the pad 52. At the apex of each A-frame member 54 there is welded or otherwise attached a tubular, vertical, support member 60 comprising a sleeve 62 in which is mounted a shaft 64 having on the upper outer end thereof a rubber tired wheel 66 and on the lower end thereof a pinion gear 68 which is driven by a ring gear 70 attached to the ends of a shaft 72 on which is mounted the large support wheel or roller 74. Shaft 72 is supported on each end by bearings 172 mounted on bearings plates 76 welded or otherwise attached between the legs 28 of the A-frame member 54. Alignment beam 246 is shown.

Figure 4:
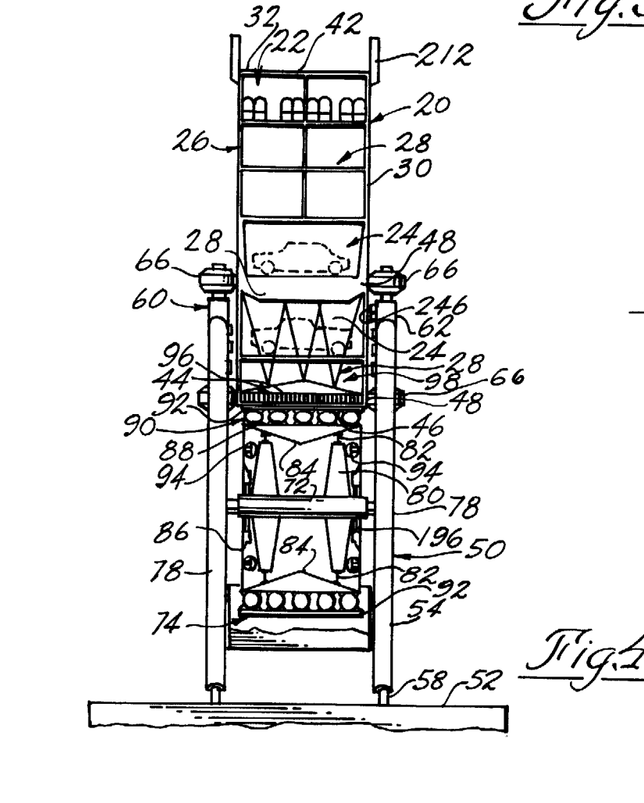
FIG. 4 is a cross-sectional view taken substantially along lines 4—4 in FIG. 3.

The large pylon support wheel 74 is shown in cross-section in FIG. 4 and comprises a cylindrical formation having conical plates 80 extending radially from shaft 72 and supporting beams 82 across which are mounted support beams 84 and in the manner of a closed cylindrical drum the sides of the wheel 74 are enclosed by stationary plates 86. The outside periphery structure of the wheel 74 is enveloped by a closed series of metal rims 88 about which are a plurality of transversely arranged circular supports 90 each one of which is similar to a huge radial tire casing about which is the external steelbelted periphery or cover 92 of the wheel 74.

Each wheel is shown in FIG. 4 as driven by means of a pair of motors 94. These motors integrated into the wheel and hub structure generate torque directly thereby avoiding redundant machine elements, heat and friction generating inefficiencies et al of external driving means. Power (D.C. or A.C.) is delivered via slip rings or commutator 196.

Figures 10, 11, 14:
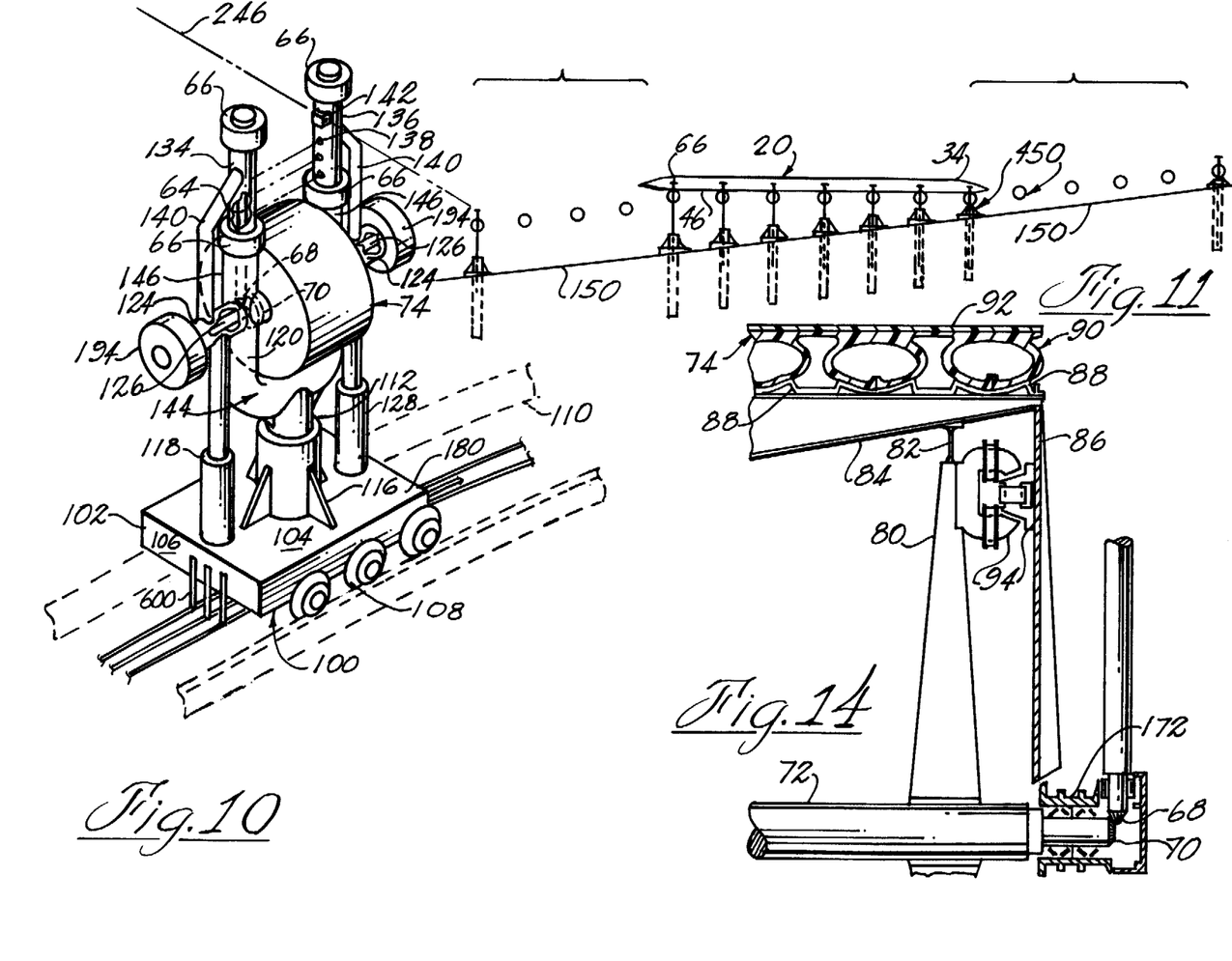
FIG. 10 is a perspective view of a modified form of the pylon which is mounted on a movable dolly traveling on rails.
FIG. 11 is a diagrammatic elevation view illustrating the relationship of pylon which are articulated vertically for transporting the vehicle along a grade.
FIG. 14 is an enlarged cross-sectional view of a pylon as shown in FIGS. 4 and 6 illustrating the gear and pinion, bearing, wheel structure, wheel mounted rotor coils, hub mounted stator coils, tire rims, and the multiple radial tire casings with the unitary integral steel belt construction.

As seen in FIG. 10 an alternative pylon construction designated generally by reference numeral 100 comprises a dolly 102 having a platform 104, a chassis 106 mounted on trucks equipped with flanged wheels 108 to roll on rails 110. Dolly 102 comprises a central lifting cylinder 112 reinforced by plates or gussets 116 welded or otherwise attached to platform 104 and a pair of spaced alignment guides 118, 128. The pylon 100 has posts 120, 122 which form a yoke 144 mounted on the piston in cylinder 112 which supports a pair of cross forming tubular housing 124 in which shaft 72 of the other pylon construction shown in FIG. 1, FIG. 6 et al. The posts 120, 122 of yoke 144 together with the pair of horizontal tubular housings 124 and a pair of struts 140 each support a respective rigidly connected vertical tubular housing 134, 136 in which turns respectively mounted smaller shafts 64 driving the smaller wheels 66 and on which are mounted three pairs of electric eyes 138 and the pylon alignment monitor 142. The horizontal tubular housing 124 also rigidly supports smaller vertical tubular housing 146 for shaft 64.

External electric (pneumatic or hydraulic) motors 194 or any combination of these modes provide the power to propel the transit vehicle thru the pylon.

Figures 1, 2:
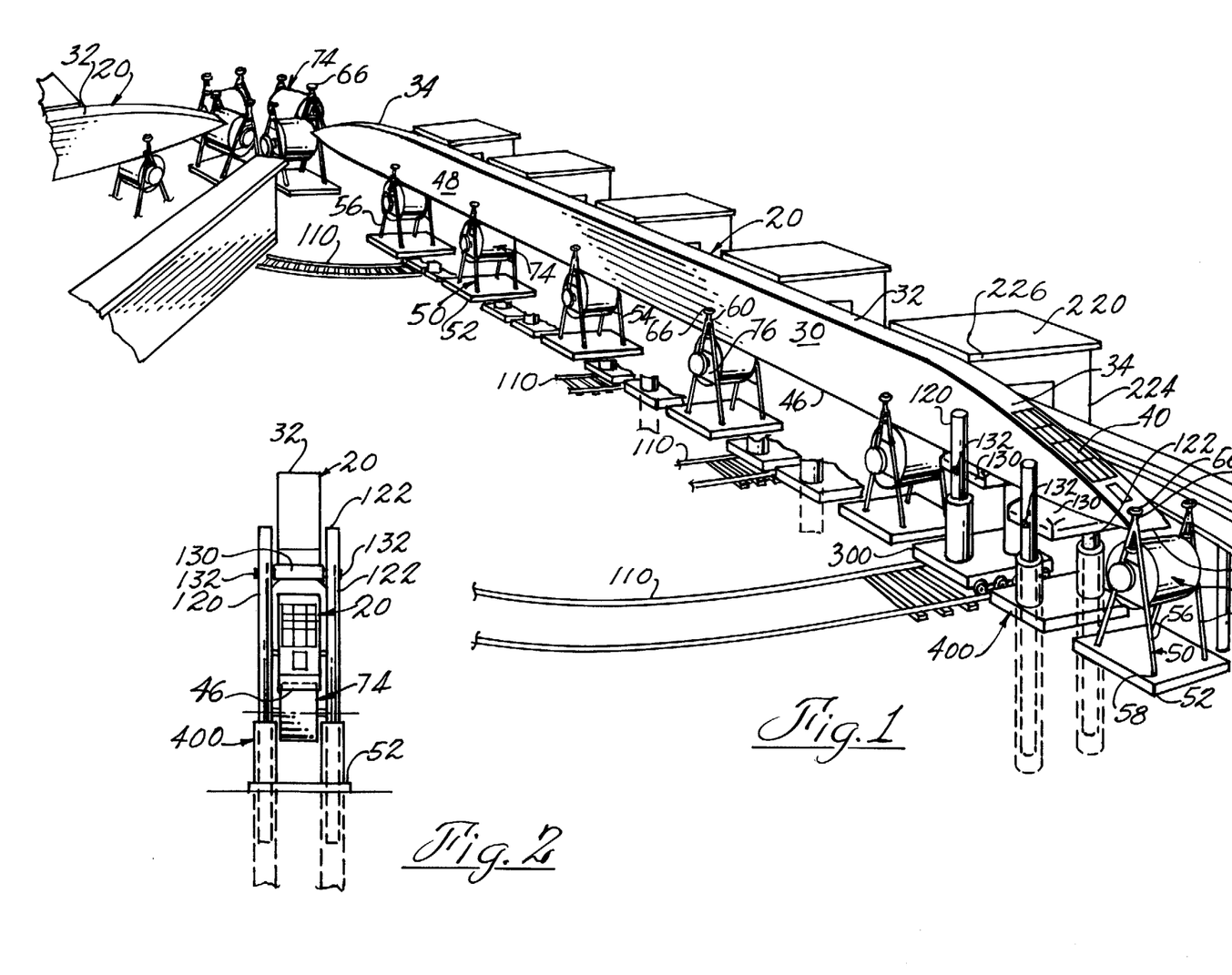
Figures 12, 13:
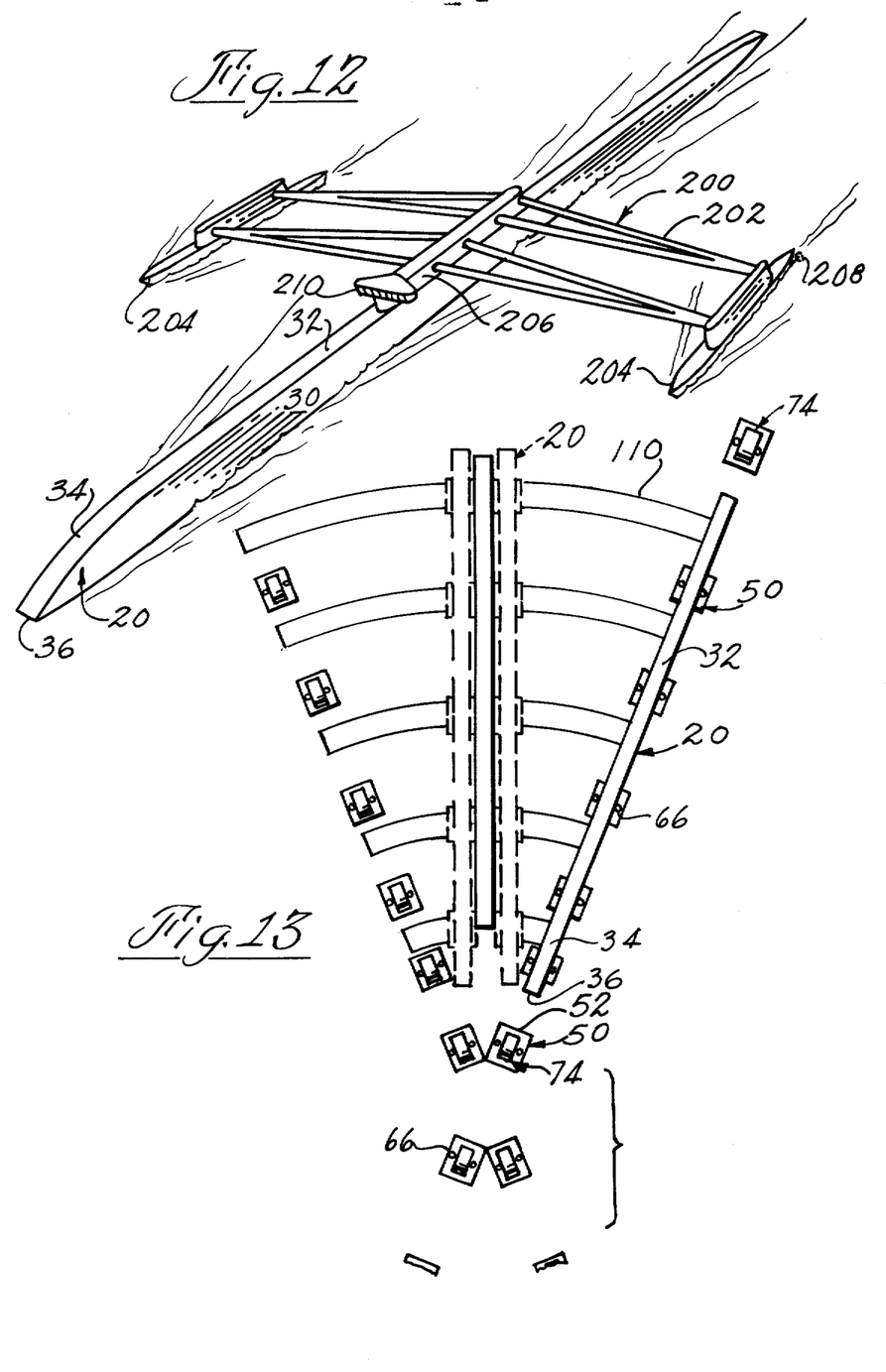
FIG. 12 is a perspective view of the transit vehicle shown in FIG. 1 and FIG. 5 having an outrigger floatation arrangement thereon for transportation on the water.
FIG. 13 has a top plan view of the same quadrant shown in FIG. 1 which illustrates the pylons supporting the vehicle in different positions at the transit exchange and the opposite quadrant in FIG. 13 shows pylons (like those shown in FIGS. 15 or 10) which provide movement to relocate the vehicle from one route to another or to move it sideways for other purposes such as across town transit or across piers sideways for shipyard loading and/or unloading as in FIG. 3.

The central power hydraulic pneudraulic or mechanically actuated cylinder 112 which telescopes to raise and lower yoke 144 similar to that shown in FIG. 1 so the entire vehicle 20 may be raised from its entry on the wheels 74 of the pylons 50 or 450 high enough to clear the uppermost pylon wheels 66 whereby the transit vehicle 20 may be revolved or translated sideways and/or tilted for changing its pitch as the systems "closed loop" digital or analog computer regulates its motion similar to the exchange activity in FIG. 1, except during this operation the transit vehicle's route segment has been terminated, the vehicle has traveled into a crossover location at a major intersection or point of transit and is scheduled to be shifted to a new line segment of route without necessarily disembarking the passengers, the vehicles, nor the freight. At a major intersection as shown in FIG. 13 this operation can be performed in the opposite quadrant from that shown occupied by the transit vehicle at the central exchange dock.

Pylon 100 comprises sets of electrical sliding brushes, rolling trolley wheels, and/or portable flexible cable harness 600 necessary to transfer power and control signals by means of D.C. and/or A.C. voltage and current to the electric motor 180 driving the hydraulic pump and/or valves, clutches, gearboxes, et al 182, to control and to provide power for the vertical motion of the lifting cylinder 112, for the horizontal motion of the dolly 102 so it is syncronized with the motions of the other dollies transporting and locating the transit vehicle, for the two electric motors 194 (or wheel integrated motors) turning on shaft 126 (or 72) which turns the large wheel 74, the ring gears 70, and the pinion gears 68 for driving the smaller shafts 64 which turns the two pairs of smaller wheels 66, for the three pairs of electric eyes 138 used to indicate the transit vehicles schedule and position, for the pylon alignment monitor 142 and for other fail-safe instruments and controls.

However, in lieu of wheel 74 on shaft 126 (or 72) there may be a pillow or pad of vehicle support construction 130 like that shown at the nearest end in FIG. 1 of alternate pylon construction 400 except the pillow or pad is mounted on pins 132 one each being in the respective posts 120, 122 of this designated alternate pylon construction 500 which is otherwise similar to designated pylon construction 100 except the small wheels function is replaced with upper structure similar to alternate constructtion 400. Either of the pylon types 100, 300, 350, 400, 500 or the pylon type 450 shown in FIG. 11 may be used to tilt the vehicle 20 at the transit stations where the adjoining route increments have different slopes causing the vehicle to stop and be repositioned before proceeding.

In FIG. 11 there is shown diagrammatically a vehicle 20 which is proceeding up a grade 150 and there are a plurality of pylons 450 at spaced locations on the grade illustrating how the cantilevered vehicle 20 may proceed across several of the pylons as it travels at reduced speeds up or down the grade 150.

Figures 6, 7, 8, 9:
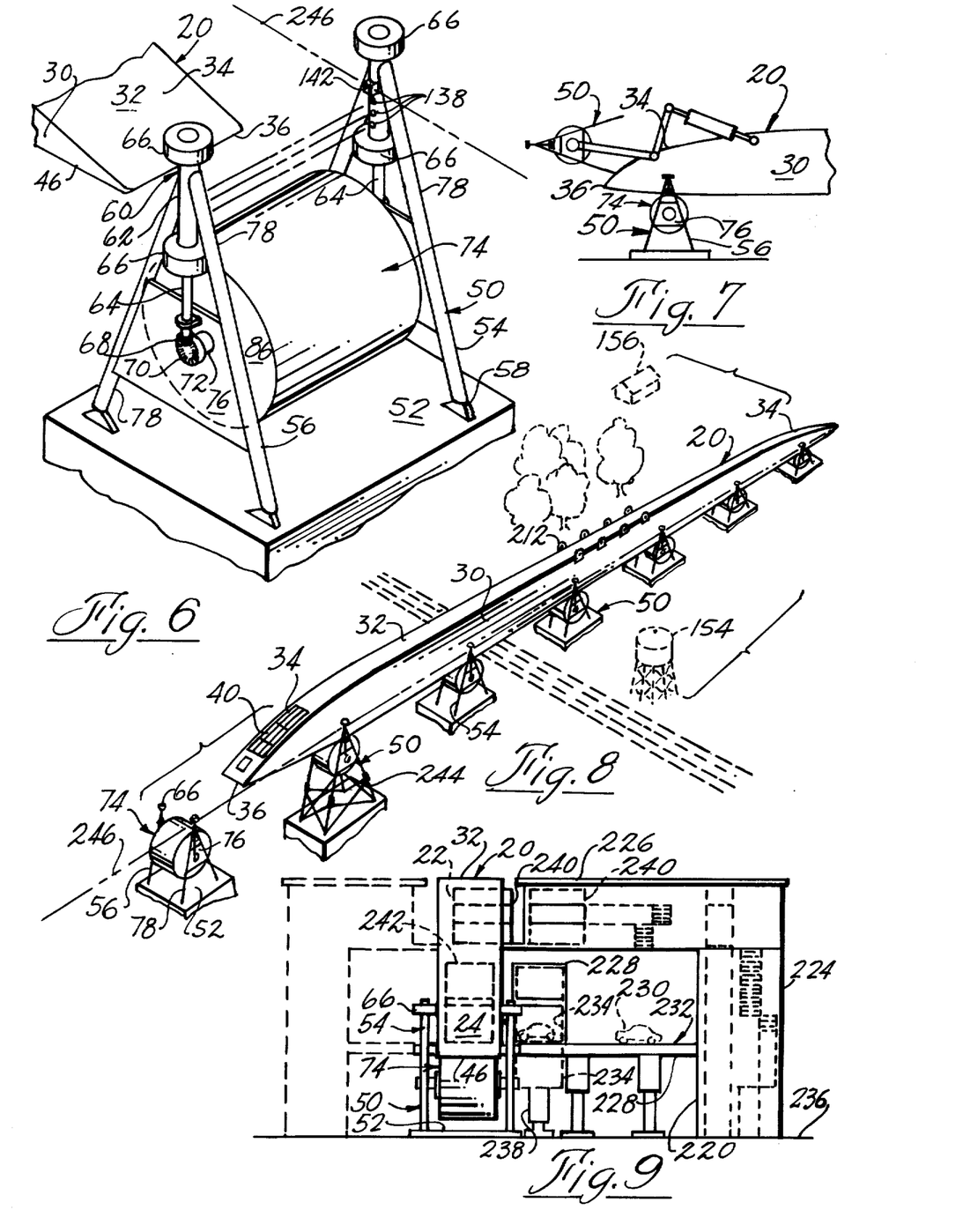

In FIG. 8 there is shown a transit vehicle 20 on a plurality of pylons 50 which have been arranged and elevated to cross over a typical road 152 near which there is a large water tower 154, houses 156 and other ground level obstacles. This illustrates and demonstrates how the vehicle 20 can be easily arranged to be elevated above ground obstacles and to proceed without interference from or interfering with such obstacles. Base frame 244 is shown.

Figure 3:
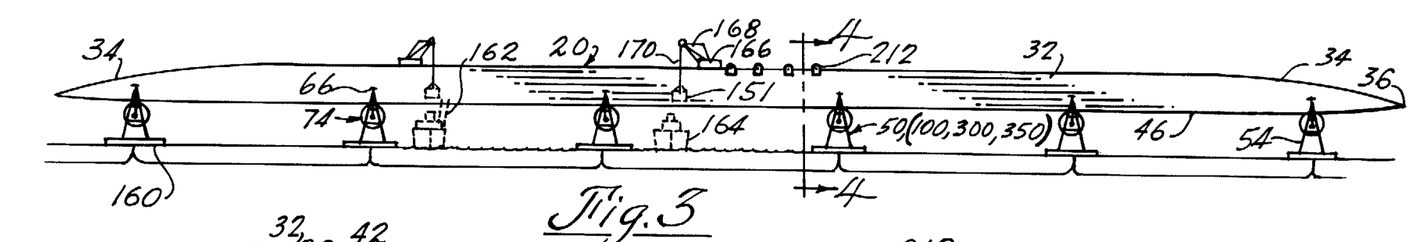
FIG. 3 is a side elevation view of the vehicle shown in FIG. 1 resting on an arrangement of pylons mounted on piers for spanning water. The power and control system conduit is illustrated below the water (or ground) as it provides service to the individual pylons.

In FIG. 3 a transit vehicle 20 is shown supported on piers 160 each of which has pylons 50, 100, 350 or 450 thereon so that the vehicle may proceed across water on which there are moored boats or ships 164 and in addition the transit vehicle is provided with conveyors 162, cranes 166 of conventional construction which includes a boom 168 and cables 170 to which there is attached cargo or a pylon 151 which may be located where needed or desired in connection with the sidewise traversal of the piers 160 (when pyons 100, 350 or 450 are used) and for the unloading of ships.

Figure 5:
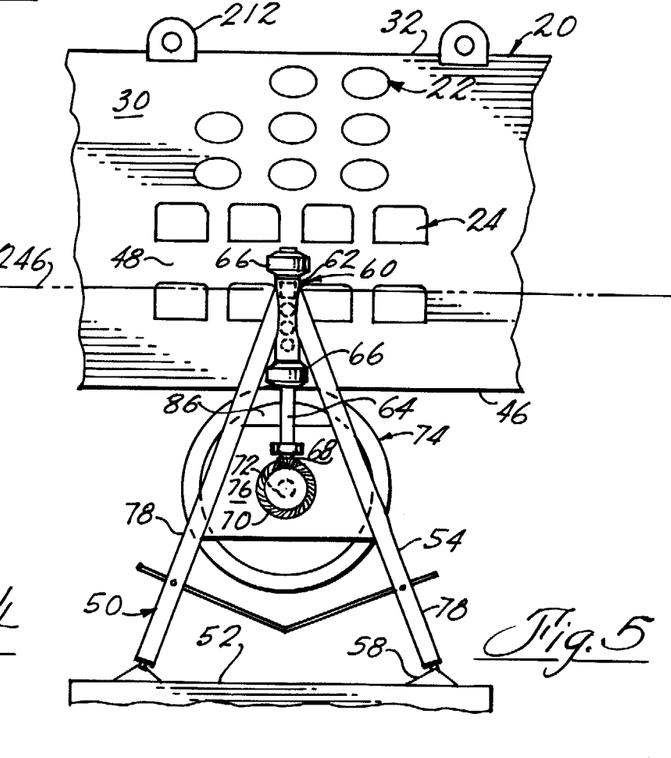
FIG. 5 is an enlarged side elevation view of a portion of the transit vehicle shown in FIGS. 1 and 3 illustrating the upper passenger windows, the lower vehicle compartments and one type of accoustically insulated supporting pylons therefor.

An alternative method of water traversal is shown in FIG. 12 wherein the transit vehicle 20 (with its built-in floatation) has been fitted with an outrigger arrangement 200 including pontoons 204 made from fiberglass, metal plate, aluminum, or other materials which are connected by outrigger struts 202 to a center frame 206 which is attached by couplings 212 shown in FIG. 5. This makes a boat out of the transit vehicle 20 by adding stability to its floatation so that it may proceed across the water by means of diesel, electric, gasoline or other power driving propellers or screws 208 on each pontoon 204 thereof controlled from the center pod or housing 210.

A typical transit station is shown in FIG. 9 and there is a pylon 50 with the roller 74 supporting the vehicle 20 which is along side one of the stations passenger and vehicle platforms 220 shown solid as also shown in FIG. 1 and which includes a shed-like arrangement having a vertical building structure 224 and a cantilevered top structure 226 with stairs, doors, on-loading passenger cages 240 and other waiting room paraphernalia for the purpose of the comfort of the passengers and for assisting in the entrance and exiting thereof. There is an elevator structure 228 near the transit vehicle 20 on the automobile loading platform 232 in front of the waiting automobiles 230 which are driven from the ground 236 up the ramp for parking in front of the cage 234 which is moved into compartment 24 or is elevated by means of hydraulic cylinder 238 on the ground and moved into compartment 242 in the vehicle 20.

The transit station shown solid in FIG. 9 and as shown in FIG. 1 handles traffic at the exchange dock where this type of activity causes a time interval between disembarking and onboarding traffic. The station as shown dotted on the left in FIG. 9 will be a typical addition to the station shown solid in FIG. 9 at all stations along the route except at junctions. This arrangement statifies traffic by permitting straight through the vehicle 20 unloading simultaneously with the loading operation thereby reducing the lost time at the line-stop station.

Figure 15:
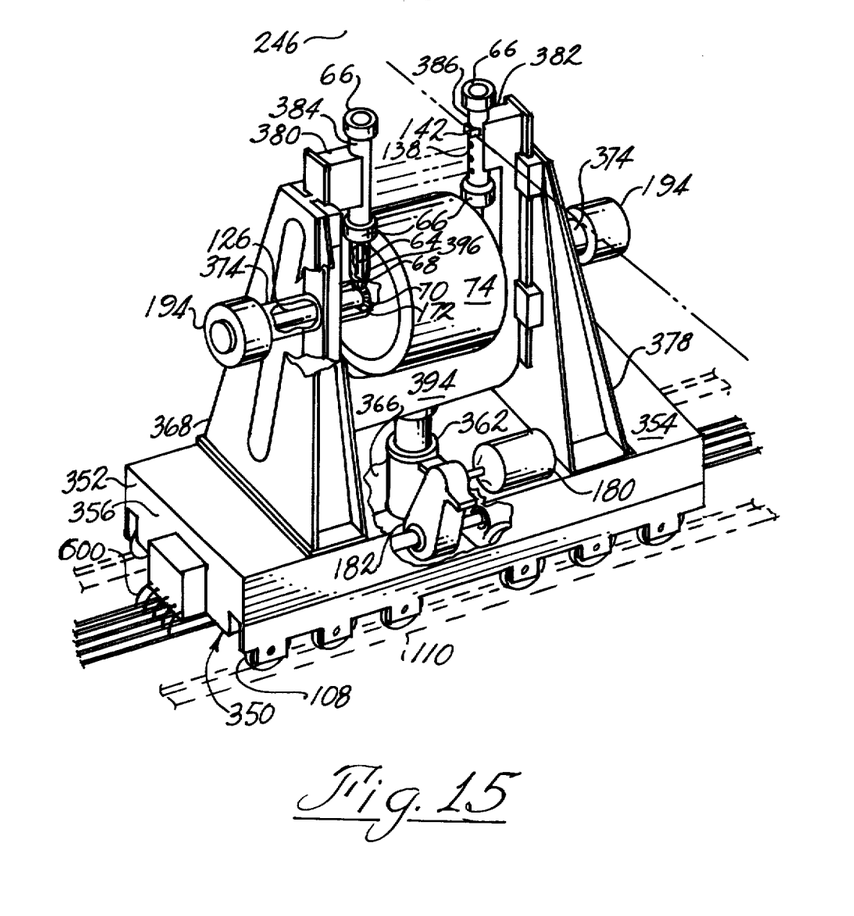
FIG. 15 is a perspective view of another form of pylon having rail wheels for truck travel.

As seen in FIG. 15, the alternative pylon construction designated generally by reference number 350 comprises a dolly 352 having a platform 354, a chassis 356, mounted on trucks equipped with flanged wheels 108 to roll on rails 110. Dolly 352 comprises a central lifting cylinder 362 reinforced by plates 366 welded or otherwise attached to platform 354 and a pair of spaced alignment guides 368, 378 for holding yoke 394 mounted on the piston in the cylinder 362 by the ways mounted on the pair of arms 380, 382. The arms support large horizontal tubular housings 374 in which turns shaft 126 (or 72) which supports wheel 74 in the manner of the shaft 72 of the other pylon construction shown in FIGS. 1 and 6 et al. The arms of the yoke 394 each have a respective rigidly connected vertical tubular housing 384, 386 in which turns respectively mounted smaller shafts 64 driving the smaller wheels 66 and on which are mounted three pairs of electric eyes 138 and the pylon alignment monitor 142. The horizontal tubular housing 374 also rigidly supports smaller vertical tubular housing 396 for shaft 64. External electric (pneumatic or hydraulic) motors 194, or any combination of these modes, provide the power to propel the transit vehicle thru the pylon.

The central power hydraulic, pneudralic or mechanically actuated cylinder 362 which telescopes to raise and lower yoke 394 similar to as shown in FIG. 1 so the entire vehicle 20 may be raised from its entry on the wheels 74 of the pylons 50 or 450 high enough to clear the uppermost pylon wheels 66 whereby the transit vehicle 20 may be revolved, or translated sideways and/or tilted for changing its pitch as the systems "closed loop" digital or analog computer regulates its motion similar to the exchange activity in FIG. 1, except during this operation the transit vehicle's route segment has been terminated, the vehicle has traveled into a crossover location and is scheduled to be shifted to a new line segment of route without necessarily disembarking the passengers, the vehicles, nor the freight. At a major intersection as shown in FIG. 13 this operation can be performed in the opposite quadrant from that shown occupied by the transit vehicle at the central exchange dock.

Pylon 350 comprises sets of electrical sliding brushes, rolling trolley wheels, and/or portable flexible cable harness 600 necessary to transfer power and control signals by means of D.C. and/or A.C. voltage and current to the electric motor 180, driving the hydraulic pump and/or valves, clutches, gearboxes, et al 182, to control and to provide power for the vertical motion of the lifting cylinder 362, for the horizontal motion of the dolly 352 so it is syncronized with the motions of the other dollies transporting and locating the transit vehicle, for the two electric motors 194 (or wheel integrated motors) turning on shaft 126 (or 72) which turns the large wheel 74, the ring gears 70, and the pinion gears 68 for driving the smaller shafts 64 which turns the two pair of smaller wheels 66, for the three pairs of electric eyes 138 used to indicate the transit vehicles schedule and position, for the pylon alignment monitor 142 and for other failsafe instruments and controls.

However, in lieu of wheel 74 on shaft 126 (or 72) there may be a pillow or pad of vehicle support construction 130 like that shown at the nearest end in FIG. 1 of alternate pylon construction 400 except the pillow or pad is mounted on pins 132 one each being in the respective arms of the yoke 394 of this designated alternate pylon construction 300 which is otherwise similar to designated pylon construction 350 except the small wheels function is replaced with upper structure similar to alternate construction 400, Either of the pylon types 100, 350 or the pylon 450 shown in FIG. 11 may be used to tilt the vehicle 20 at the transit stations where the adjoining route increments have different slopes causing the vehicle to stop and be repositioned before proceeding.

SYSTEM IN GENERAL — UNIFIED DESIGN CONCEPT

The large volume straight transit vehicle 20 has no wheels, It is long enough to be supported and conveyed by the several widely spaced pylons 50. It is high and rigid enough to safety bridge between pylons 50 as they support, guide, brake and propel the vehicle 20 to control its velocity as it proceeds quietly through the remote nearly level transportation corridors.

The transit vehicle 20 will glide over routes supported above and between sets of wheels mounted and turning on the pylons. The vehicle 20 will accelerate uniformly to continuous very high velocities while providing services between cities and widely dispersed areas. The passengers may walk about safely during transit. There will be no reason for a sudden stop.

The transit vehicle 20 will contain no power for propulsion, no power train, springs, axles, bearings, wheels or tires and will cost much less than other forms of public transportation.

Very high quality service will be feasible in any region where the terrain will permit economical construction of the long straight routes for the transit corridor.

The ground based equipment which generates the work to run the system will be easily accessible for maintenance. Pylon 50 removal for major overhaul may be easily accomplished by scheduling an enroute vehicle stop. The replacement pylon 50 will be transported by the vehicle. The defective pylon 50 will be removed and quickly replaced by quick change capabilities developed for this purpose into the system.

The power, safety and control installations which operates the vehicle will be installed in the pylons and in the right-of-ways along the various routes in the system.

The vehicles 20 are static structures. They have low accelerations and stresses imposed on them having closely controlled conditions, therefore, they should last for a long time and require very little maintenance.

The system will support, transport and exchange a wide variety of cargo loads quickly with reduced power consumption and use more accessible power sources with less harm to the enviornment. The frequent long delays enroute and changing of modes of transportation normally incurred will be sharply reduced. The very heart of urban areas will be opened to high speed mass traffic with efficient distribution to local or other distant areas.

The transit vehicle will automatically on-board and carry passengers, small licensed highway vehicles and fast light freight to be automatically off-boarded at the individual points of departure where each item of cargo will go its separate way.

The routes will be the major cost of the system. As the need for more services develop more of the lesser expensive transit vehicles may be constructed and scheduled as a permanent part of the system. As the population shifts so will the vehicles.

Local routes will include many carefully developed innovations and compromises. They must remain adaptable to the future trends which involve the branch, regional and international routes, so as to retain their compatibility with the transit system.

When traversing the local routes over highly populated areas the quietly moving vehicles will make more frequently stops over shorter distances at slower speeds. Since the vehicle is about five blocks long, it will not stop but about every ten blocks.

The passengers, if they wish, may walk during transit to their off-boarding destinations. This will be especially useful during foul weather. Precision schedules will be maintained. The transportation will be dependable.

Branch routes throughout the system may use controlled alternates, if necessary, to coordinate the local routes with the regional routes in the system.

Regional route construction plans must first consider the lay of the land for its future potential so that cargo services throughout the region will attain their maximum efficiency. They should not be required to conform to national boundaries. International pacts will be necessary.

All transit route equipment, except for foundations, shall be fabricated so the equipment shall be readily transferrable in case of redeployment to any newly selected route, maintenance swap over, need for redevelopment or obsolescence.

All components in the transit system shall be dimensionally controlled, tested and functionally approved before the beginning of the equipment manufacturing operation. This will help to provide the minimum construction time, construction cost and insure the minimum maintenance time, maintenance costs, and the maximum flow potential within the system.

COMPONENTS — UNIFIED DESIGN CONCEPT

A. Transit Vehicle (Example)

The transit vehicle 20 will be a rigid structure approximately 21 feet wide by 60 feet high and 1500 to 2000 feet long. It will include the necesary features required to provide safe, efficient service to as many as 10,000 passengers on the vehicle.

It will provide stability during high winds with gusty conditions, have low vibration at all speeds or load conditions and will avoid harmonic conditions which causes oscillation due to the high pulsating loads imposed on the vehicle 20 as it traverses the pylons along the routes. No acceleration, pitch, roll, yaw or bumpiness should be perceptible except for the light flexing of the vehicle as it rolls between pylons.

The base and lower sides of the vehicle 20 will be very smooth and have great continuous local strength for absorbing and supporting the local, traversing, high pulsating loads of the wheel footprints up and through the vehicle outer walls and center webb structure to be combined with those in the top flange roof structure to generate the overall rigidity of the vehicle. The base will support and propel while the lower sides guide the vehicle smoothly quietly and safely between the pylons 50.

The base 46 and sides 20 of the vehicle will be gently curved inward at both ends, so the high speed vehicle will smoothly engage the synchronously rotating, supporting and guiding wheels 74 in the upper pylon 50 structure and will effectively distribute the vehicle supporting, guiding and wind loads onto these wheels.

The vehicles engagement with the next pylon 50 in the series, across a distance of approximately 300 feet, will provide the initial continuous and only "bridge" as either end proceeds along the route.

The streamlined top of the vehicle 20 will curve downward approximately 300 feet from the ends 34, 36. This will reduce the cantilevered weight and thereby the structural requirements near the ends 34, 36.

The first and second levels of the transit vehicle has cubicles for transporting automobile and freight cages. These cubicles may be open so the ventilation will reduce the wind side load while the vehicle is in motion.

The first level will always transport automobiles and freight.

The second level, however, may have all or selected cubicles quickly convertible for transporting passengers whenever this is necessary.

The contruction of the vehicle will strictly follow the dimensions and arrangements required by the master plan to provide for the quickly transfer of passenger, automotive and freight traffic (in cages) directly between the transit vehicle and stations and/or the exchanges.

The third level and above will always be equipped for transporting passengers.

COMPONENTS — UNIFIED DESIGN CONCEPT

B. Pylon Installations

The rugged pylon 50 etc. installation structures support the transit vehicle corridor at least 60 feet above the right of way property.

These fail safe installations stand ready, their large wheels 74 start rolling in groups and accelerate to match the transit vehicles velocity, deliver thousands of horsepower in short bursts as the vehicle passes over. The regenerative braking of the vehicle and/or the wheels 74 returns power into the system. These installations also intercept, position, index, elevate, and revolve the transit vehicles during their scheduled motions throughout the system.

The stationary pylon 50 etc. installations may be erected in very rough terrain. These structures are composed of a (lower) "base frame assembly" 52, which may be erected from several sections, their heights varying to conform with the changing terrain profile and an (upper) "power" frame assembly.

The (upper) power frame includes transformers, rectifiers, power controls, circuit breakers, disconnected switches and quick removal power and control recepticles from the power and signal conduits below grade and up through the foundation and the pylon base frame.

The power frames are equipped with multiple redundant instrumentation continuously monitored by central control to insure the dependable operation of the systems which precisely respond to all central control commands.

Corridor alignment monitors detect and report any drifting or settling of the pylons. Seismographic activity is continuously evaluated and correlated.

De-icing equipment may be provided to insure that all fail safe devices are responsive.

The two guiding wheels 66 on each side of the power frame 54, 56 absorb the wind side loads and are geared to turn at the same tread velocity as the propulsion wheels.

The Steel belted nylon multiple cushion radial tires 90 which support the vehicle have continuous recording automatic tire pressure controls. The tires 90 are equipped with pressure cross bleeding to insure equalized pressures. Nylon tire thump, which is characteristic when a hot automobile tire cools with one side flattened, will not be a problem because the tires in this transit system will rarely cool while hot.

Triple "vehicle position" timing pilots continuously monitor the position of the route vehicle.

Wheel acceleration controls limit the maximum tread velocity prior to engagement with the vehicle.

As the vehicle 20 rolls over the propulsion wheels load cells release the surge of propulsion current regulated by the central control "vehicle position generator" comparison with the "vehicle schedule generator" to compensate for tire friction, bearing friction, air resistance, grade conditions and the discrepancy in schedule to continuously reset this schedule discrepancy reported by the vehicle position timing pilots.

Vibrations and noises from the wheels, axles and bearings and the bearing reactions and temperatures will be continuously recorded and monitored.

Torque reaction instruments which continuously monitor the propulsion and braking systems and electrical motor current loads incurred during the braking cycle will provide another check in the fail safe system.

Should a power frames propulsion or braking system ever fail, there will be several others to pick up the emergency load. This will cause no adverse reaction as with highway vehicles.

The noise generated by the pylons may be shielded and reflected upward by fitting interchangeable accuostical insulators and deflectors onto standard mounting lugs on the pylons.

Footings for these pylons may be excavated, compacted, stabilized and provided with anchors to safely support, prevent settling, restrain and minimize drifting of the foundations. Soil drainage and leaching problems will be minimized.

Massive concrete and steel foundations will be securely anchored and poured into these excavations to provide ballast to restrain the dynamic, supporting, propelling and wind loads while maintaining their alignment for the rapidly moving vehicles.

Adjustable connections will be installed on the upper surface of the foundations so that all base frames of the pylon installation structures may be adjusted to maintain the alignment of the transit vehicle corridor.

The base frames at transit stations may be constructed as an integral part of the station platform's base structure, thereby increasing the rigidity between the transit vehicle and platform during the on and off-loading operations.

There are several types of power frames. Each frame is mastered for interchangeability with the upper connections on the base frames in its catagory to avoid delays during installation when they are replacements during preventive maintenance or maintenance service stops.

The "AO"-type power frames are equipped with a large wheel for supporting and four smaller wheels for guiding the transit vehicle. Motors integral with the wheel or external are used to propel and brake the vehicle.

The "AYO-S"-type stationary power frames are similar to the "AO"-type frames except they conserve electrical energy by providing hydraulic force to supplement the torque required by the propulsion wheels in conveying the transit vehicle.

The power frames are equipped with a large stationary longstroke hydraulic cylinder. Groups of these pylons lift either end of the transit vehicle to generate a down slope (either way) across the top of the pylon wheels as they convey the vehicle.

The continuous reaction by the rolling vehicle (as it accelerates along the continuously rising down slope) provides the change in velocity required to compensate for the mechanical friction and wind velocity and to satisfy the "AYO-S"-type system schedule programmed into the central control computer.

The timing pilots continuously verify the vehicle's position. Hydraulic adjustments and the necessary torque are combined to regulated and to maintain this slower vehicle schedule.

The pylon wheels 74 ahead of the transit vehicle 20 acclerate to match the vehicle's velocity as they intercept and rise under the vehicle at varying speeds.

This system may be used in areas where electrical power is not plentiful and where tidal power driving hydraulic rams will be available, or in areas where hydraulic power can be generated by dams or falling water.

The "AYO-M"-type mobile power frame is similar to the "AYO-S"- type except it has a large, short stroke hydraulic cylinder, is constructed on a chassis and is mounted on power driven trucks to move along rails while syncronized with other similar pylons.

Sets of these power frames can be used between other pylons 50 along the route to lift and remove the transit vehicle 20 from the transit corridor so that traffic may pass and so the transit vehicle may be:

a. Transported sideways over highly populated areas to improve the local cargo distribution in these areas.

b. Transported sideways along rows of piers extending over bays or harbours so the transit vehicle may span the water over the areas and take on or disgorge cargo from ocean-going ships tied to the piers.

c. Transported to storage locations.

d. Revolved at the exchange station between adjacent routes during exchange operations.

e. Revolved from the station automotive, freight, and passenger platforms to the exchange dock and vice versa.

COMPONENTS — UNIFIED DESIGN CONCEPT

(C) TRANSIT SYSTEM ROUTES

By controlling the local route corridors and transit vehicles 20 the local vehicles will interface with the large standard standard transit vehicles and schedules used throughout the system.

The evolution of the system should provide networks of routes lacing the regions together to serve the local areas with accurately scheduled, convenient, dependable, safe, enjoyable and almost effortless transportation.

The long straight transit vehicle 20 will be standard construction, however, local or branch controlled alternate routes may have special vehicles which do not ravel throughout the system. These vehicles may also be rigid but with a built in curve so they may travel a large circular route like the loop around a large city.

When all local, branch and regional transit route corridors are erected at least 60 feet above the terrian it is practical to build "line of sight" straight and nearly level routes for many miles.

The base frame heights of the pylon installation 50 structures will vary to conform with the requirements of the changing terrain profile.

The routes, constructed in segments, will provide permanent right-of-way clearance, maximum straightness and the minimum grades that are economically feasible to provide fail safe service by the transit vehicles.

The route segment locations will be carefully developed to provide the most feasible construction plan by considering the long range effects of all topographic features of the area.

If the slight flexibility of the vehicle 20 is combined with the cushion of the propelling tires 90 the route segments may have very shallow turns and changes in grades over long distances.

All rapid transit system routes will have networks of power equipment and controls to quietly and smoothly propel the transit vehicles safely and dependably on schedule.

Authority to resolve legal disputes claiming eminent domain or other actions which may routinely jeopardize the transit corridor concepts must require prior legislation.

The title to land for pylon foundations every three hundred feet or so and the right-of-ways for the air corridors and the overhead or below grade power and control systems must be negotiated.

A single route system will effectively handle two way traffic. Auxiliary equipment may be easily transported and erected by the transit vehicle at any new location in the system. This flexibility makes the operation more efficient at the cargo exchange installations.

The NEED to STOP, which is really the big killer, has been carefully eliminated by this system. The wheels 74 which convey the transit vehicle 20 are accelerated to its velocity a considerable distance ahead of the vehicle. The possibility of a collision between vehicles 20 is very remote along the isolated corridors since the wheels 20 may turn in only one direction. These transit vehicles 20 respond only to the carefully developed continuously monitored fail safe command logic generated in the central computer. Fool proof interlocks will be designed into the networks.

The straight route segments composing the rapid transit system will terminate at intersections. These obstacles may be negotiated by using the standard transit system components used at the line-stop and exchange stations.

However, the transit vehicles 20 can turn, change pitch and switch route segments safely and dependably while traveling at reduced speed (without stopping) provided these installations are equipped with more sophisticated rolling stock and other equipment.

The sets of pylons 50, etc. may be equipped to syncronize and duplicate the unified pattern of continuous horizontal and vertical movements necessary to safely and dependably intercept, accept and guide the lower sides and to engage roll, support and propel the base of the transit vehicle so the system may perform at a more rapid rate than otherwise possible.

A rapid transit exchange station 224 will be erected at level route crossings and junctions. These installations will be the center of much activity. They will be erected from standard components and operate automatically on pre-determined schedules.

Both transit vehicles 20 as they arrive to exchange cargo will:
 a. Stop beside the multi-level transit platforms 232;
 b. latch into position for automatic cargo termination; and
 c. off-load the terminated passenger, automotive and freight cages onto the platforms 232 so the cargo may disperse down the exit escelators, ramps and elevators into the local ground level transportation systems and storage areas.

Mobile exchange pylons 400 will lift the transit vehicle 20 at each exchange platform above the guiding wheels on the route pylons 50, revolve them sideways toward the multi-level exchange dock constructed between the two routes at the junction (so "main-line" traffic may pass) and latch them into their position for cargo exchange on opposite sides of the exchange dock.

All passenger, automotive and freight cages 240 scheduled to exchange routes will be automatically transferred straight across the exchange dock into empty cubicles in the adjacent vehicle and vice versa.

Both transit vehicles will immediately leave the dock, return, be lowered, latch into positions at their multi-level transit platforms 232, where the terminated traffic has dispersed and the arriving traffic has parked, been processed and scheduled for on-boarding into the empty cargo spaces in the vehicle. The cargo will automatically on-load and each vehicle will proceed along its route.

The facility for transferring vehicles 20 between routes will occupy another quadrant at the route crossing or junction and the areas required to refurbish and store those transit vehicles on call for immediate use will adjoin this facility.

TRANSIT STATIONS

Line-stop transit stations (of various types) will service the straight transit routes. These highly efficient installations will be tailored (with standard components) to meet the requirements of the system and the local areas.

The QUICK line-stop station has an on-boarding multi-level transit platform 224 on one side of the transit corridor and an off-loading platform 224 on the other side.

Simultaneous, very quick, through the vehicle, on and off-loading operations are provided at these stations.

The LIFT line-stop station has long-stroke, dual cylinder, cushion or pillow type stationary pylons 400 to lift the transit vehicle straight up over the transit corridor to the multi-level transit platform for on and off-loading so the route traffic may pass below.

The SHIFT line-stop station has one multi-level transit platform beside the transit route where cargo will off-load when the vehicle arrives. This station and the local area is provided with mobile pylons and track corridors which lift the transit vehicle above the guiding wheels and move it sideways, for traversing the adjoining area to a second multi-level transit platform some distance away, where on and off-loading takes place.

The transit vehicle then returns to the "main-line" transit route on-loads cargo and proceeds along the route.

CONSTRUCTION OF THE SYSTEM — UNIFIED DESIGN CONCEPT

One of the first routes to be constructed may be erected along the level areas of the coast line to bridge potentially valuable remote areas, demonstrate the feasibility of continental shelf installations and to get early design data on vehicle reliability while traveling at high speeds in hurricane velocity winds. The vehicle 20 can be thoroughly tested with no personnel aboard.

Higher priority, however, may require the construction to serve a congested city especially if the city seldom has high winds.

Surveying the transit route will be easy because the lines of sight will usually be above the terrain. Large specialized equipment may be used.

The large facility for fabricating, assembling, and constructing the transit system will be serviced by rail and water ways. Materials delivered by highway will be held to a minimum. The facility site will be along a permanent transit route so the vehicles, pylons, and equipment after erection will be transferred directly into the system.

The vehicles 20 design will be carefully controlled to make the optimum use of specialized machinery for producing the structural configurations which utilizes the materials effectively with minimum welding and splices during assembly.

Near duplication of all transit vehicles 20 will be maintained to provide dependable cargo interchange operations at all transit stations and exchanges in the system.

The straightness of the base and the lower sides along the central area of the vehicle will be a prime consideration. The smoothness of travel in each vehicle will depend on the straightness of these surfaces.

The initial pylons 50, etc. when erected will receive the first transit vehicle 20. This vehicle 20 will travel over the railroad sidings and the waterways and transport heavy material and equipment as the project accelerates during successive stages of route construction.

Many large components such as wheels and tires 90 may provide their own floatation and may be towed to the site by ocean or river floatation by a tug.

It is obvious the transit vehicle 20 using the route will encounter no traffic to the end of the line where it can reach out 300 feet over the position for the next pylon 50, etc. without impeding local activities, to excavate and ancor the f oting, pour the foundation and erect the next pylon which will be used by the vehicle for installing the successive pylons in the system.

The first transit vehicle 20 will be temporarily set up with steam generators and auxiliary power plants for heating and air conditioning systems, material conveyors, air comprssors, metal fabricating equipment and concrete mixers. The terminal or head end will include a crane, pile driver, excavating equipment, boring apparatus, welding equipment, tooling equipment and concrete chutes, so that most of the heavy work can be done quickly at each new pylon location.

The second transit vehicle 20, used for shuttling personnel, materials and equipment will be temporarily fitted for hoisting, weighting, mixing, storing, and conveying. It will load, mix, store, transport, convey and/or unload material and/or equipment to the first vehicle during the successive pylon installation activities.

The route construction will proceed rapidly during all weather conditions. Rain, snow, sleet, etc. will not impede construction.

Inaccessible areas such as swamps, jungle, frozen wastelands, rocky land, continental shelves, river basins, and downtown areas of cities will usually be easily accessible for pylon construction. City center to city center construction will cause very little disruption of traffic.

If the crest of a hill must be removed for the route, the combined torque of the pylon wheels may be used to drive the vehicle like a giant bulldozer with a built-in conveyor to make the cuts through the hill. If the power is insufficient drag lines may pull the vehicle to supplement the power as required.

The excavating equipment on the end of the vehicle may also progressively grade the cuts through the hill as this soil is also removed by conveyors to be transferred into and redistributed by the second vehicle along the route to develop roadbeds, if desired, which parallel the transit route.

If a tunnel is necessary the head end of the vehicle may be fit up with boring apparatus and the conveyors in the vehicle may deliver the material to the second vehicle for redistribution where needed.

ADVANTAGES — UNIFIED DESIGN CONCEPT

The construction of this mass transit system will provide tremendous monetary dividends. Much needless destruction and impositions upon our cities as required to construct other types of systems will be avoided. To list a few: The temporary and/or permanent diversion of cross town traffic. The disruptions of business activities, the acquisition of excessive right-of-way property and demolition of structures and equipment along this right-of-way, the construction of networks involving graded roadbeds, and roadbed exchanges, culverts, bridges, trestles, and viaducts, the waste of land made functionally useless along the shoulders of the roadbeds which must be landscaped and permanently maintained.

Throughout this system less demolition and almost no roadbed grading will be required. Drainage systems will remain intact. Unnecessary cuts and fills with their permanent maintenance costs, environmental damage including continuous leaching of the soil and waste of valuable, useful, taxable land will be avoided.

The activities in all areas will remain relatively undisturbed. The existing or future grade level traffic routes which cross the areas will be neither temporarily detoured nor permanently relocated.

The costs of the system's right-of-ways should not be excessive.

The system will function efficiently during bad weather. Rain, sleet, fog, deep snow nor high winds, up to hurricane velocity, will have no effect on the safety and dependable schedules. Arctic weather will present no hazards. The sleet, snow and ice will be thrown free when the wheels turn and at low speeds crushed when the wheels touch the vehicle.

The emergency need to stop, which is the real killer, will be eliminated by the remote corridor and the fail-safe equipment built into the system. No horn or headlight will be necessary. By avoiding the dangers of surface level travel, the cost of accidents, the expensive insurance premiums, the cares of driving, tie ups in traffic and late arrivals will be avoided. There will be a sharp reduction in the number of traffic deaths.

The roof decks of all the passenger loading platforms may be used as helicopter landing pads to provide very quick passenger service between distant local areas.

The top of the transit vehicle may transport and launch air freighters. Alerted pilots working in downtown areas may quickly man fighters on top of the vehicle for take-off as it proceeds for interception work, thereby streamlining our defense position. It may also serve as a portable ground to air missile launching platform.

V.T.O.L. aircraft landing in downtown areas during bad weather may be lifted for take-off from the top of the vehicle as it proceeds along the route.

The routes will pass through airport terminals to exchange cargo efficiently for rapid delivery into adjacent cities and/or to other areas served by the local, branch or regional routes in the transit system. This close association will minimize the need for parking automobiles at airports.

Outsized cargo, which has plagued inland transportation industry because of railroad tunnels, low bridges, highway vehicle lengths and aircraft sizes, will present no problem to these transit vehicles. Very bulky and/or long heavy articles may be easily transported over great distances on top of the vehicle at high speeds.

The wide mobile home delivery on our highways will be diminished because the transit vehicle using the HIFT line-stop stations will deliver and quickly lower complete prefabricated home units ready for occupancy onto their waiting foundations along the paths between pylon track corridors to construct model cities with pre-planned transportation systems, coordinated with the transit schedules. The homes when necessary may be quickly transported to new locations.

If the three and a half day work week becomes a reality, the company owning the transit vehicle can change cities twice weekly and come to the people instead of requiring them to come to work.

Central distribution agencies receiving telephone orders will provide fast, automated deliveries to local parcel pick-up or delivery centers by the fast freight concept, thereby eliminating the discount store between the customer and the factory.

The postal system would have another dependable, high speed, large volume method of rapid mail transfer over wide areas.

Shallow water activities such as pile driving, cason installation and salvage will become greatly simplified by floating into position temporary pylons. Highways may be constructed paralleling these routes by using the transit vehicle.

Many areas which are normally inaccessible across swamps, jungles, rivers, deltas and along continental shelves will become potentially useful, thereby reducing our population density.

The electrical power supplies of the transit system may be oversized (temporarily above grade or permanently below grade) and made available temporarily to help develop or for use of newly populated areas created along the transit route.

Inland cities may have portless coastal access to unload and transport cargo directly from ship/tanker anchorages with minimum pollution risk independent of tidal waters thereby eliminating the need for constructing and maintaining inland water ways.

The vehicle will transport cargo across deep water efficiently thereby avoiding the inconvenience, exposure to the weather, and the normal delays encountered by transferring to ships.

Inland manufacturers with undesirable chemical wastes may transport chemicals, neutralize their by-products quickly, reship the harmless or stabilized materials to be disposed at sea or to be transported by ship for deposit at selected locations in the ocean depths, thereby helping to clean up our inland water sheds and rivers.

Obsolete luxury liners floating off shore can become useful for cruises or be made into manufacturing plants for sea products or other products and the passenger or worker can commute by the transit vehicle.

The remote closed high speed transit vehicles may pass quietly over our public park and unused wildlife areas. The animals will not present a hazard and they will not be harmed. Therefore, no roadbed isolation barriers will be required. The ecology and the wildlife habitat for these areas will be preserved. The wildlife will remain inaccessible to the passengers on the transit vehicle. Unlike the roadbed vehicle these passengers cannot stop to feed them but will have a panaramic view of the unspoiled wildlife areas. Many of the Sunday drivers who crowd our highways may frequently ride the comfortable transit system, with its bird's eye view to observe the countryside.

The uncomfortable bumpiness caused by the wake from boats or ships, the turbulence encountered in flight, the uncomfortable sensation when the wheels on vehicles roll across intermittent rails at tract junctions, and the intersecting drainage grades at roadbed junctions will be avoided by passengers riding the transit vehicle. When two transit routes cross, the high speed vehicles will glide smoothly through the level junctions with safety even though cross traffic is nearby.

Acts of war may knock out the pylons, but they may be quickly replaced by the vehicle. Control systems may be substituted and/or supplemented temporarily with AM telemetry.

This high speed vehicle cannot be hi-jacked since it has a prescribed route and is remotely controlled.

The smooth, high speed and close schedules of the transit vehicle will provide a method for fast shipment of fresh, fully ripened bulk unrefrigerated produce over distances of thousands of miles. (i.e. from Florida to Maine, Canada or Alaska) to provide these areas with year-round fresh, economical food.

HOW THE SYSTEM FUNCTIONS — UNIFIED DESIGN CONCEPT

Any automobile driver wishing to ride the transit vehicle 20 may be required to have a minimum number of passengers. He looks ahead along the espressway as he approaches the on-boarding turn off to the transit station or exchange to observe the departure time and number of scheduled vacancies to his destination.

He may turn from traffic, drive up the access ramp onto the "lower" vehicle platform 236 before the transit vehicle 20 arrives and turn into any (scheduled open) parking space in front of any empty 21 foot long, automobile on-boarding cage.

All occupants must remain in the automobile. The driver must show his driver's license, schedule the automobile off-loading station, pay the fare, turn in the keys, set the brakes and close all the doors.

The automobile on-boarding cage 240 will automatically move over the car and latch shut.

The automobile cubicle on the transit vehicle 20 scheduled to arrive at the transit station at this location automatically becomes reserved for the entire scheduled trip of this automobile.

Minimum facilities necessary for the occupants are built into the individual automobile cages.

When the first or second level automobile cubicle in the transit vehicle 20 is scheduled to arrive empty or its cargo to be off-loaded the automobile parking space and cage 240 at this location will be automatically scheduled (open).

When one cage 240 at this location is occupied by an automobile it will be on-loaded into the lower cubicle when the vehicle 20 arrives. If a second automobile parks in the scheduled (open) space behind the cage because the arriving vehicle will have a vacancy at the second level, the first cage and automobile will be lowered so another vacant cage will descend onto the platform for the second automobile.

When this case is occupied and latches shut the parking space will be scheduled closed. The pair of cages will automatically rise and be automatically on-loaded when the vehicle arrives.

By this process the first level vehicle cubicles are filled first so the center of gravity of the vehicle will be low.

When the empty parking spaces are scheduled (closed) the automotive or freight cubicles on the transit vehicle at this location will be occupied and will not be off-loaded when the vehicle arrives.

The personnel on-boarding cages on the "upper" personnel platform levels will operate more simply but in a similar manner.

It should be carefully noted that the transit vehicle 20 has a prescribed route, is remotely controlled and therefore this high speed vehicle cannot be hi-jacked.

All personnel, automobiles and freight will be continuously automatically weighted to satisfy the continuously monitored vehicle load distribution parameters.

At quick line-stop transit stations immediately after the transit vehicle arrives and latches into position beside the cages, the personnel, automobile and freight cages will be automatically on-boarded and locked in place while the simultaneous off-loading of other personnel, automobile and freight cages takes place from the opposite side of the transit vehicle.

Each cubicle will transport one automobile cage with automobile and passengers. The passengers will ride sideways in the seats of their weather proof automobiles and sleep, if they wish. The automobile cases will be automatically off-loaded at the scheduled destination.

All desired passenger accommodations, including television or other entertainment, may be provided on the vehicle.

MASTER PLAN — UNIFIED DESIGN CONCEPT

This new transportation system has been carefully developed by critically examining and thoroughly recognizing the requirements that produced the different systems as we know them in our transportation networks.

The basic concepts such as the priorities of the structural arrangements, the sources of power, the operation cycles of each system, the disposition of cargo, the advantages, the disadvantages, the flexibility of route locations and the long range effect upon the adjacent areas they serve have been reconsidered as to form and means for solving the many shortcomings in our accumulating transportation dilemma.

It is clear that a radical restructuring of the transportation complex is necessary in order to meet the accelerating demands of a growing population and the industrial economy which must grow with it.

The master plan for the new system will provide first class service from a coordinated transportation network by using a UNIFIED STRUCTURAL DESIGN CONCEPT which has practical application to the transportation demands of many regions throughout the nation.

Many of the advantages of our different transportation systems will be unified and many of the disadvantages of these systems will be eliminated. Population density and minor variations in the terrain have very little effect on the system.

The system will provide a smoothly interfacing network of local, branch and regional transit routes. They will transport passengers and cages of highway vehicles and fast freight on precision schedules with a maximum of comfort and safety at speeds as high as 250 m.p.h. The flexible schedules will be dependable regardless of traffic loads or weather conditions. Many of our traffic hazards will be avoided. No visual nor audible warning equipment will be needed. Environmental pollution will be greatly reduced.

The flow of traffic will be efficiently distributed. The automatic on-and-off loading of highway vehicles will make the transit system more adaptable and useful.

This system challenges and corrects many of the shortcomings of other systems. The basic principles which make this system possible are:

a. High speeds are practical at low altitudes provided the right of way for the transportation system is high enough to safely clear all structures supported on the ground or over the water.

b. Very large cushion tired wheels will support and transport great loads efficiently, smoothly and safely and will require a reasonable amount of power to propel and control these loads.

c. A series of structures provided with adjustable footing mounts and erected on secure foundations across rough terrain are more easily maintained and kept in alignment than rails mounted on roadbeds.

d. Modified box beams with large verticle cross sections will cantilever across great distances safely with very little deflection.

By combining these basic elements a transit vehicle may be constructed that will cross cities, open country, deserts, swamps, jungle, rain swollen rivers, bays, coastal areas, sleet, snow, and fog covered areas at high speed on precision schedules with comfort and safety providing a panaramic view to those who travel. In cities the demolition of buildings and existing streets for roadbeds will be eliminated. Construction and maintenance of new road beds, drainage systems, isolation barriers and by-passes will be avoided.

The separation and isolation of areas within the cities and in the country by these unnecessary roadbeds will have been eliminated.

As the population grows the expense required to double or triple the systems capacity by adding transit vehicles will be low because the routes, which is the most expensive part of the system has already been constructed.

Direct city center to city center service with smooth interface between the various routes throughout the system will be provided.

The need for emergency or unscheduled stops will be virtually eliminated. Almost no time will be wasted.

The master plan provides for the mechanical interchangeability and/or indexing of all components in the transit system and for the safe dependable generation of all motion within the various local, branch and regional transit routes.

While I have shown and described a system with modifications thereof this is by way of illustration and there are various changes, alterations, revisions, ommissions, deviations, departures, substitutions and other choices which may be made in that shown and described without departing from the scope of my invention as defined only by reference to the appended claims and interpretations thereof.

What is claimed is:

1. In an elevated, cantilevered mass rapid transit system:
    a. a mass rapid unitary transit vehicle comprising an elongated vehicle structure having an elongated wide, continuous substantially horizontal and smooth bottom, said vehicle having sides with substantially vertical portions,
    b. a plurality of individual, spaced pylons supporting said vehicle in spaced relation above the ground including uneven terrain and each pylon comprising a base supported on the ground or other support surface and a support structure extending upwardly therefrom defining a space within said support structure in which said transit vehicle is supported whereby the front of said vehicle is cantilevered outwardly from one pylon toward the next until engaged therewith,
    c. at least more than one of said pylons in supporting said vehicle at any given time having a power driven vehicle drive wheel mounted thereon within the confines of said pylon and the outer contact surface of said wheel entirely substantially across the width of said pylon, said wheel having a substantially continuous contact cylindrical surface having transverse portions engaged by the entire width of said bottom of said vehicle continuously as said vehicle moves over said drive wheel and there being power means for driving said drive wheel on said pylon continuously at a synchronized, predetermined speed to engage the moving bottom surface of said moving transit vehicle at high speed,
    d. said wheel having a flexible and resilient surface across the width thereof which is indented by the engagement with the bottom of said vehicle to provide a footprint as said vehicle and said wheel move in contact with one another,
    e. and said pylons further having guide means including guide wheels attached to both sides of said pylon for contacting and thereby guiding said substantially vertical portion of said vehicle sides,
    f. said vehicle having a nose defined in the direction of movement and said bottom being inclined upwardly at said nose whereby there is a gradual contact between the vehicle and the drive wheel.

2. The device claimed in claim 1 wherein each pylon includes a frame support having frame members on each side and a base member on which said frame members are rigidly mounted,
    said drive means being a drive wheel and there being a shaft on said wheel mounted on respective side frame members.

3. The device claimed in claim 2 wherein said drive wheel is supported on a shaft on said respective side frame members and there is a strengthening structure between the shaft and the outer surface of the wheel.

4. The device claimed in claim 3 wherein said drive wheel has a plurality of individual compressible members therearound and a cover on said compressible members.

5. The device claimed in claim 2 wherein there are side wheels on each side of each pylon on a respective side frame thereon, each side wheel being guide wheels driven by a power tranfer means from said drive wheel and said side wheels having resilient surfaces contacting the sides of said vehicle during motion thereacross.

6. The device in claim 1, wherein: said drive means is a drive wheel electrically driven from a motor, and there being a commutator arrangement supplying electricity.

7. The system in claim 1, wherein: said structure is provided with removable outrigger floatation means, and there being detachable coupling means for detachably attaching said flotation means.

8. The system in claim 7, wherein; said flotation means includes outrigger frame, struts and pontoons.

9. The system in claim 1, wherein: said structure has compartments therein and said vehicle is constructed from elongated truss members including beams, transverse truss members including beams, and continuous upper and lower plates, said vehicle being covered by a sheet material such as aluminum, stainless steel and the like.

10. The system in claim 1 wherein: said drive wheel is power driven in a syncronization with said vehicle and has a compressible surface that moves to generate with the vehicle a footprint across the top of the compressible surface and which footprint is released by the vehicle as it proceeds.

11. The system in claim 1 wherein: said pylon has upwardly extending sides above the wheel and there are guide wheels on each side engageable with the side of the vehicle, and the sides of the vehicle being curved to engage the guide wheels.

12. The transit vehicle claimed in claim 1 wherein: there is a means for vertically elevating said vehicle to raise same above said pylon,
    said means for elevating being shiftable over the ground whereby said vehicle may be transferred from one set of pylons which extend in a line in one direction to another set of pylons extending in a different direction.

13. The device claimed in claim 12, wherein: said means for elevating is a support member brought into contact with the bottom of said vehicle and there being power elevating means such as hydraulic cylinders for elevating said members against the bottom of said vehicle.

14. The device claimed in claim 13, wherein: said means for elevating includes a movable base having movable ground support means such as wheels thereon.

15. The device claimed in claim 14, wherein: said base is mounted on a track and said wheels are track wheels.

16. The device claimed in claim 1 wherein: there are a plurality of pylons in a linear direction and there are a plurality of linear directions intersecting at a group of pylons arranged at least two in a line whereby said linear arrangement of pylons establishes one route and there are several intersecting routes.

17. The system claimed in claim 1, wherein:
said pylon comprises a base,
ground support wheels mounted on said base whereby said base may be moved in different directions,
power means on said base for driving said wheels,
a pair of upstanding support frames spaced on said base,
a vehicle drive wheel mounted on said upstanding supports,
power drive means on said support for driving said wheel,
side wheels mounted on said supports for contacting the sides of said vehicle as said vehicle passes between said supports and over said drive wheel,
and power means for driving said side wheels.

18. The device claimed in claim 17, wherein:
said drive wheel comprises a drive shaft mounted on said supports and a compressible surface on said wheel which compresses in response to the weight of said transit vehicle.

19. The device claimed in claim 17, wherein:
said ground wheels are track wheels and said base travels on a track on the ground,
electrical supply means adjacent said track and there being electrical contacts on said base in contact to receive electricity,
electrical drive means on said base for driving said wheels.

20. The device claimed in claim 19, wherein:
said wheel having a compressible surface comprising a series of compressible tires in spaced relations and attached to the surface of said wheel and said tires being covered by a uniform cylindrical surface.

21. The system claimed in claim 1 wherein:
said transit vehicle has a power lifting device mounted on one end thereof and said power lifting device being extensible and retractable to lift and support and move a pylon whereby said vehicle may remove pylons and replace same by means of said power lifting.

22. The device claimed in claim 1, wherein:
said pylons are mounted on floats that float on water whereby said vehicle may cross rivers, lakes, streams and the like on the pylon supported on the floats.

23. The system claimed in claim 1, wherein:
said pylons are arranged in a line establishing a route in one direction and there being a plurality of different directions,
each pylon being movable over the ground in an arc which radiates from a point establishing the beginning of a particular route and all of the pylons being shiftable in the same direction in an arc over the ground whereby a plurality of different routes in a straight line may be established by moving said pylons and restationing said pylons in a substantially straight line to establish a different direction and route.

24. The system claimed in claim 1, wherein:
said pylons comprise opposed supports mounted on a pylon base,
said supports being spaced on said base and supporting said wheel therebetween,
power elevating means on said base for power lifting said wheel to elevate or lower same thereby to establish the elevation of said wheel above said base when said base is supported firmly on the ground, said pylons being arranged substantially in a line establishing a route and said wheels being elevated as selected to establish the grade and elevation between several pylons whereby the straight, elongated vehicle supported on a plurality of said elevated pylons will travel in a direction and at an angle established by the elevation of said pylons.

25. The device in claim 1 wherein there is a power drive means for said guide wheels from said drive wheel.

* * * * *